Patented Apr. 29, 1947

2,419,735

UNITED STATES PATENT OFFICE 2,419,735

CONDENSATION PRODUCTS OF DIOLEFINS WITH DIARYLAMINES AND ANTIOXIDANT COMPOSITIONS CONTAINING SAID PRODUCTS

Arthur W. Sloan, Stow, Ohio, assignor to The B. F. Goodrich Company, New York, N. Y., a corporation of New York No Drawing. Application September 25, 1941, Serial No. 412,303

5 Claims. (Cl. 252—401)

This invention relates to new compositions of matter containing the condensation products of conjugated diolefins with diarylamines made in the presence of an acidic catalyst.

The mixtures which are the subject of this invention are of great value as antioxidants for organic materials which tend to deteriorate in the presence of atmospheric oxygen. Among such materials are fish oils, linseed oil, tung oil, gasolines containing unsaturates, all varities of natural rubber such as caoutchouc, balata, gutta percha, latex, reclaimed rubber, artificial rubber isomers, and such synthetic rubbers as polychloroprene and copolymers of butadiene, isoprene, 2,3-dimethyl butadiene, piperylene, and the like with acrylonitrile, styrene, methyl acrylate, methyl methacrylate, isobutylene, and other copolymerizable monomers.

These new antioxidants may be added to the material to be preserved in any suitable manner. If desired, they may first be dissolved in a suitable solvent. They may be added to rubber, for example, on a roll mill or in an internal mixer or by any other suitable method; or they may be applied to the surface of the rubber composition either in their pure form or as a solution in a suitable solvent, or they may be dispersed in the rubber latex. The presence of other compounding ingredients, such as any of the ordinary pigments, fillers, dyes, accelerators of vulcanization, or other antioxidants, has no deleterious effect upon the antioxidant properties of my new materials.

The materials of my invention contain the condensation products of short-chain (less than about eight carbon atoms) conjugated diolefins with diarylamines. The conjugated diolefins which may be used comprise butadiene-1,3; piperylene; 2-methyl butadiene-1,3; 2,3-dimethyl butadiene-1,3; 2-methyl pentadiene-1,3; 2,3-dimethyl pentadiene-1,3; hexadiene-1,3; 5-ethyl hexadiene-1,3; hexadiene-2,4; heptadiene-1,3; heptadiene-2,4; and other similar compounds. Among the diarylamines which yield suitable products are diphenylamine, phenyl-alpha-naphthylamine, phenyl-beta-naphthylamine, the ditolyl amines, the phenyltolylamines, the dinaphthylamines, anilino tetraphenylmethane, phenyl-p-xenylamine, dixenylamine, dianilinodiphenylmethane, p-hydroxydiphenylamine, p-aminodiphenylamine, N,N'-diphenyl-p-phenylenediamine, anilino-biphenylene oxide, anilino-acridine, 6-anilino-quinoline, p-chlorodiphenylamine, p-isopropoxydiphenylamine and the like. The secondary amine reaction products of diarylamines with alcohols, aldehydes, and ketones are also the chemical equivalents of the diarylamines themselves for this reaction. Neither the hydrocarbon nor the amine reactant need be pure, but may be employed in the form of a mixture with other materials of the same general class.

The catalysts which may be used for the synthesis of my new materials comprise $HCl$, $H_3PO_4$, $H_2SO_4$, $NaHSO_4$, $ZnCl_2$, $AlCl_3$, $BF_3$, $SnCl_4$, $NH_4Br$, $I_2$, and the like. In general, any of the well-known acidic condensation catalysts may be used.

The relative proportions of the conjugated diolefin and the diarylamine may vary over a wide range, although neither ingredient should be present in a quantity greater than about six molecular proportions of the other. I have found that the best results are obtained if two molecular proportions of the diarylamine are used for one of the conjugated diolefin. The unused diarylamine and hydrocarbon by-products may readily be separated from the reaction products and recovered. Although I have found 0.1 mole of catalyst to be most effective with one mole of diarylamine, other amounts, from 0.01 to 1.0 mole, may be found desirable under special conditions.

The reaction can usually be carried out at a temperature of 50° to 300° C., and at either atmospheric or elevated pressure, depending upon the reagents used. In some cases a reaction vessel with an acid-resistant lining may be required, and usually an agitator is desirable.

As a specific example of my invention I have carried out the following process. One molecular proportion of butadiene-1,3 is heated with two molecular proportions of diphenylamine in the presence of 0.1 molecular proportion of zinc chloride at a temperature of 200° C. for four to five hours in an autoclave equipped with a stirrer. The reaction mixture is then washed with hot water under pressure and with strong caustic solution to remove the zinc salt. After heating at reduced pressure to distill off unreacted hydrocarbon and diarylamine, the mixture is a dark, oily liquid.

A crystalline deposit may be separated from this mixture after it has been allowed to stand for some time. Upon recrystallization from alcohol this crystalline mass may be separated into three distinct compounds.

The first occurs in the form of white flat needles, melting at 52° to 53° C. Analysis of the compound melting at 52° to 53° C. gives: carbon 86.05%, 86.11%, hydrogen 7.61%, 7.67%; nitrogen 6.00%, 6.12%. The analysis calculated for p-(2-butenyl)diphenylamine is: carbon 86.1%; hydrogen 7.68%; nitrogen 6.22%. Upon reduction with hydrogen the product melts at 18° to 19° C., and when mixed with a known sample of p-n-butyl diphenylamine, M. P. 19° to 20° C.) it melts at 18° to 19° C. Thus it is conclusively shown that this first compound is p-(2-butenyl) diphenylamine.

The second compound isolated from the mixture occurs in the form of white plates and melts at 67° to 68° C. It contains one molecular proportion of butadiene and one molecular proportion of diphenylamine. Upon bromination this compound reacts in the same way as diphenylamine, indicating that the side chain is saturated. The analytical results are: carbon 86.08%, 86.14%; hydrogen 7.64%, 7.70%; nitrogen 6.06%, 6.20%. A mixed melting point determination shows that this compound is not identical with

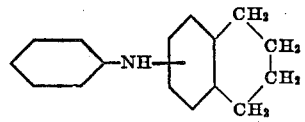

it is therefore believed to be an anilino methyl indane:

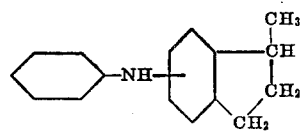

The third compound separated from the mixture, occurring in the form of white plates, melts at 148° to 148.5° C. and gives the analysis: carbon 86.61%, 86.63%; hydrogen 8.40%, 8.30%; nitrogen 5.13%, 4.95%. The analysis calculated for di-2-butenyl diphenylamine is carbon 86.64%; hydrogen 8.30%; nitrogen 5.06%. It is therefore believed that this new compound is p,p'-di-(2-butenyl)diphenylamine.

I have also found that a synergistic effect appears in mixtures of the afore-mentioned class of materials with alkylated diarylamines. That is, the mixture possesses not only the same antioxidant properties as each of the components, but possesses them to a greater degree.

The alkylated diarylamines, which are readily prepared by a variety of methods, need not be pure to be effective in mixtures with the conjugated diolefin-diarylamine reaction products. Alkylated diarylamines which have been prepared by two or more of the methods commonly used may be present in the same mixture without harmful results. One of the syntheses of this class of materials which is in general use is the reaction of a hydroxy aryl compound with an alkylated arylamine in the presence of an acid catalyst. Another method is the reaction of a diarylamine with an aliphatic alcohol in the presence of an acid catalyst. Still a third method which has proved successful is the condensation of a monoolefin with a diarylamine in the presence of an acid condensation catalyst.

In carrying out the last two methods of synthesis, there may be used any of the diarylamines which are suitable for reacting with the conjugated diolefins as described in a preceding paragraph. Among the mono-olefins which may be used are: ethylene, propylene, butylene, pentene, gasoline, particularly unsaturated gasoline such as that known as vapor phase cracked gasoline, turpentine, pinene, cyclohexene, and such aralkenyl compounds as react like the mono-olefins, e. g. styrene, indene, etc. The catalysts used for condensing the conjugated diolefins with the diarylamines are also effective in all of the three methods used to produce alkylated diarylamines. If the reaction of a diarylamine with an alcohol be used, any aliphatic mono-hydric alcohol, straight or branched chain, yields satisfactory products. As in the reaction between the diarylamines and the conjugated diolefins, none of the reactants need be pure, but may be mixtures of similar materials.

As an indication of the superiority of my mixtures as antioxidants over the individual components, I have prepared the following rubber composition, in which the parts are by weight:

| | |
|---|---:|
| Rubber | 100.0 |
| Zinc oxide | 5.0 |
| Sulfur | 3.0 |
| Carbon black | 50.0 |
| Stearic acid | 3.5 |
| Pine tar | 3.0 |
| 2-mercaptobenzothiazole | 1.0 |
| Antioxidant | 2.0 |
| | 167.5 |

In the data tabulated below, which shows the antioxidant properties of my new mixtures, each sample contains a different antioxidant substituted in the foregoing recipe: sample A, the reaction product of diphenylamine and butadiene, as described; sample B, the reaction product of one mole of diphenylamine and one mole of a cracked gasoline fraction boiling at 70° to 105° C. consisting largely of mixed heptenes, prepared in the presence of zinc chloride at about 200° C.; sample C, a mixture of A and B in equal proportions; sample D, the reaction product of one mole of diphenylamine and one mole of pentene-2 prepared in the presence of zinc chloride at about 200° C.; sample E, a mixture of A and D in the proportion of one part of A to two parts of D by weight. The samples were all vulcanized at 279° F. for 30, 60, or 90 minutes. In the tables, T indicates ultimate tensile strength in pounds per square inch, and E indicates ultimate elongation in percent. The flexing tests were run on a DeMattia flexing machine; the figures tabulated indicate the amount of cracking, from 0 (none) to 10 (failure) after the indicated number of flexures, which were carried out at the rate of 300 per minute at 80° F. (27° C.).

| Cure | A | | B | | C | | D | | E | |
|---|---|---|---|---|---|---|---|---|---|---|
| | T | E | T | E | T | E | T | E | T | E |
| 30 | 3,070 | 660 | 3,310 | 645 | 3,320 | 655 | 3,550 | 640 | 3,620 | 625 |
| 60 | 3,650 | 580 | 3,760 | 560 | 3,850 | 600 | 3,930 | 565 | 4,080 | 595 |
| 90 | 3,700 | 550 | 3,700 | 520 | 3,870 | 590 | 3,930 | 540 | 4,120 | 555 |

AFTER AGING 96 HRS. AT 70° C. IN OXYGEN AT 300 LB./SQ. IN.

| | | | | | | | | | | |
|---|---|---|---|---|---|---|---|---|---|---|
| 30 | 2,670 | 595 | 2,560 | 610 | 2,780 | 600 | 2,410 | 580 | 2,660 | 600 |
| 60 | 2,590 | 500 | 2,400 | 500 | 2,700 | 500 | 2,290 | 470 | 2,570 | 505 |
| 90 | 2,250 | 430 | 2,190 | 415 | 2,500 | 410 | 2,070 | 420 | 2,350 | 415 |

AFTER AGING 14 DAYS IN AIR AT 70° C.—FLEXED AT 80° F.

| Thousands of Flexures | A | B | C | D | E |
|---|---|---|---|---|---|
| 100 | 0.3 | 0.0 | 0.0 | 0.0 | 0.0 |
| 200 | 1.0 | 0.5 | 0.3 | 0.8 | 0.7 |
| 300 | 1.0 | 0.8 | 1.0 | 1.0 | 1.0 |
| 400 | 1.0 | 1.0 | 1.0 | 2.5 | 1.0 |
| 500 | 1.0 | 1.0 | 1.0 | 3.2 | 1.0 |
| 600 | 1.3 | 1.5 | 1.3 | 3.2 | 1.0 |
| 700 | 1.5 | 1.8 | 2.2 | 4.2 | 1.0 |
| 800 | 2.5 | 2.7 | 2.7 | 5.5 | 1.5 |
| 900 | 3.0 | 2.8 | 3.3 | 6.2 | 2.5 |
| 1000 | 6.2 | 4.3 | 3.8 | 6.3 | 2.5 |
| 1100 | 6.8 | 6.0 | 4.3 | 6.2 | 2.5 |

AFTER AGING 48 HOURS AT 70° C. IN OXYGEN AT 300 LB./SQ. IN.—FLEXED AT 60° C.

| | | | | | |
|---|---|---|---|---|---|
| 20 | | | 0.0 | 0.0 | 0.0 |
| 40 | | | 2.3 | 1.0 | 0.5 |
| 60 | | | 8.3 | 1.7 | 1.0 |
| 80 | | | | 6.7 | 1.7 |
| 100 | | | | 8.3 | 2.3 |
| 120 | | | | | 3.7 |
| 140 | | | | | 4.0 |
| 160 | | | | | 4.7 |

It is evident from these data that mixture C is superior in antioxidant properties to both of its components A and B; likewise, mixture E is much better than A or D. Similar results may be secured by mixing the reaction products of diarylamines and conjugated diolefins with alkylated diarylamines prepared by other methods. For example, I have found that a mixture of equal parts of A, the reaction product of diphenylamine and butadiene, and the reaction product of diphenylamine and di-isopropyl carbinol is about as effective as C.

The relative proportions of the two components may vary over a wide range, but in general there is no appreciable synergistic effect unless each is present in at least one-sixth the amount of the other.

My new composition of matter is also effective with such synthetic rubbers as the copolymers of conjugated dienes with other copolymerizable monomers. As a specific example of this effect I have prepared the following composition, in which the parts are by weight:

| | |
|---|---|
| Copolymer of butadiene and acrylonitrile | 100 |
| Zinc oxide | 100 |
| Titanium dioxide | 25 |
| Dibutyl phthalate | 12.5 |
| Coumarone-indene resin | 12.5 |
| Sulfur | 1.25 |
| Accelerator | 1.25 |
| Mixture of reaction products of diphenylamine with butadiene, diphenylamine with butene-2, and diphenylamine with diisopropyl carbinol in equal amounts | 3.00 |

In the following table are given the ultimate tensile strength (T) in pounds per square inch and ultimate elongation (E) in percent of the rubber composition described above (A). The values for a similar composition containing no antioxidant (B) are also given. The effect of adding my new material to the rubber is clearly shown by the measurements on these compositions after aging in oxygen at a pressure of 300 lb. per sq. in. at 70° C. for 6 days in a Bierer-Davis bomb.

| Vulcanization time in min. | A | | B | |
|---|---|---|---|---|
| | T | E | T | E |

BEFORE AGING

| | | | | |
|---|---|---|---|---|
| 15 | 1,400 | 730 | 1,450 | 680 |
| 30 | 1,300 | 660 | 1,450 | 580 |
| 45 | 1,500 | 630 | 1,450 | 570 |

AFTER AGING 6 DAYS IN BIERER-DAVIS BOMB

| | | | | |
|---|---|---|---|---|
| 15 | 1,175 | 700 | 1,200 | 630 |
| 30 | 1,050 | 630 | 1,175 | 550 |
| 45 | 1,300 | 620 | 1,175 | 550 |

Of particular importance is the increased elongation of the composition containing the antioxidant. This effect may be obtained also with alkylated diarylamines alone.

Another important property of rubber compositions containing my new materials is their resistance to discoloration by sunlight. The white synthetic rubber composition containing antioxidant described above, for example, shows no signs of staining after exposure to sunlight for two months. Alkylated diarylamines by themselves, especially those containing five or more carbon atoms in the alkyl chain, are especially good in this respect in either natural or synthetic rubber compositions. The use of mixtures containing the reaction products of conjugated dienes and these alkylated diarylamines in light-colored rubber compositions produces materials having both a high tensile strength and ability to withstand the staining effect of sunlight.

Although I have herein described specific embodiments of my invention, I do not intend to limit myself solely thereto, but only to the spirit and scope of the appended claims.

I claim:

1. A composition of matter comprising a mixture of alkylated diarylamine with a composite condensation product, said condensation product being prepared by heating a conjugated diolefin containing less than eight carbon atoms with a diarylamine at a temperature of about 50° to about 300° C. in the presence of an acidic condensation catalyst.

2. A composition of matter comprising a mixture of alkylated diphenylamine with a composite condensation product, said condensation product being prepared by heating a conjugated diolefin containing less than eight carbon atoms with diphenylamine at a temperature of about 50° to about 300° C. in the presence of an acidic condensation catalyst.

3. A composition of matter comprising a composite condensation product, said condensation product being prepared by heating a conjugated diolefin containing less than eight carbon atoms with a diarylamine at a temperature of about 50° to about 300° C. in the presence of an acidic condensation catalyst.

4. A composition of matter comprising a composite condensation product, said condensation product being prepared by heating butadiene with diphenylamine at a temperature of about 50° to about 300° C. in the presence of an acidic condensation catalyst.

5. A composition of matter comprising a condensation product prepared by heating butadiene with diphenylamine at a temperature of about 50° to about 300° C. in the presence of an acidic condensation catalyst, said condensation product having the property of forming white crystalline flakes melting at 67° to 68° C. and having the composition: carbon 86.11%; hydrogen 7.67%; nitrogen 6.13%.

ARTHUR W. SLOAN.

REFERENCES CITED

The following references are of record in the file of this patent:

UNITED STATES PATENTS

| Number | Name | Date |
|---|---|---|
| 2,255,386 | Howland | Sept. 9, 1941 |
| 2,256,189 | Bogemann et al. | Sept. 16, 1941 |
| 2,048,781 | Craig | July 28, 1936 |
| 2,075,549 | Semon | Mar. 30, 1937 |
| 2,180,936 | Dunbrook | Nov. 21, 1939 |
| 2,200,756 | Messer | May 14, 1940 |
| 2,029,642 | Semon | Feb. 4, 1936 |